(12) United States Patent  
Veligdan

(10) Patent No.: US 6,999,665 B2
(45) Date of Patent: Feb. 14, 2006

(54) DISPLAY PANEL HAVING DUAL DIRECTIONAL DIFFUSION

(75) Inventor: James T. Veligdan, Manorville, NY (US)

(73) Assignee: Scram Technologies, Inc., Dunkirk, MD (US)

( * ) Notice: Subject to any disclaimer, the term of this patent is extended or adjusted under 35 U.S.C. 154(b) by 95 days.

(21) Appl. No.: 10/267,821

(22) Filed: Oct. 9, 2002

(65) Prior Publication Data

US 2004/0071417 A1  Apr. 15, 2004

(51) Int. Cl.
*G02B 6/04* (2006.01)
(52) U.S. Cl. .................................. 385/120; 385/115
(58) Field of Classification Search ............... 385/120, 385/133, 115, 116, 146, 147, 901; 353/69, 353/70, 98, 122
See application file for complete search history.

(56) References Cited

U.S. PATENT DOCUMENTS

| | | | | |
|---|---|---|---|---|
| 4,978,952 A | * | 12/1990 | Irwin | 345/102 |
| 5,144,416 A | * | 9/1992 | Hart | 348/795 |
| 5,381,502 A | * | 1/1995 | Veligdan | 385/115 |
| 5,462,700 A | * | 10/1995 | Beeson et al. | 264/1.27 |
| 5,625,736 A | | 4/1997 | Veligdan | |
| 5,856,855 A | * | 1/1999 | Mol et al. | 349/65 |
| 6,222,971 B1 | * | 4/2001 | Veligdan et al. | 385/120 |
| 6,301,417 B1 | | 10/2001 | Biscardi et al. | |
| 6,389,206 B1 | | 5/2002 | Veligdan | |
| 6,400,876 B1 | | 6/2002 | Biscardi et al. | |
| 6,457,834 B1 | * | 10/2002 | Cotton et al. | 353/122 |

OTHER PUBLICATIONS

3M Electronic Display Lighting, "3M Transmissive Right Angle Film (TRAF) II," 1996, 4 pages.

* cited by examiner

*Primary Examiner*—Daniel Stcyr
(74) *Attorney, Agent, or Firm*—Reed Smith LLP; Matthew J. Esserman; William J. McNichol, Jr.

(57) ABSTRACT

An optical panel includes a plurality of stacked optical waveguides bound by black cladding to collectively form an inlet face and an opposite display screen. An inlet diffuser has an inlet surface, and an opposite outlet surface adjoining the inlet face of the waveguides. Asymmetric diffusion of image light is effected by the inlet diffuser for increasing field of view, with ambient light being absorbed through the display screen for increasing contrast. Alternatively, an outlet diffuser may be provided at the display screen to complement the inlet diffuser by differently diffusing the image light spatially at the display screen.

39 Claims, 4 Drawing Sheets

DISPLAY PANEL HAVING DUAL DIRECTIONAL DIFFUSION

BACKGROUND OF THE INVENTION

The present invention relates generally to optical panels, and more specifically to optical display panels comprising optical waveguides.

When viewing any type of display screen, image contrast is an important parameter which affects viewing quality. To achieve high contrast in all ambient lighting conditions, it is necessary that the viewing screen be as dark as possible. This enables the actual black portions of the image to appear black.

U.S. Pat. No. 5,625,736 discloses an optical display panel defined by laminated waveguides in a wedge form having a narrow inlet face along the bottom thereof, and a vertical outlet screen disposed at an angle thereto. The waveguides are positioned between the inlet face and the screen and are inclined at a small acute angle with respect to the plane of the screen for transmitting image light with total internal reflection within the waveguides.

The image light is transmitted at an angle upwardly through the inclined waveguides, and is therefore not directly emitted perpendicularly to the screen in the typical direction of a viewer. The intensity thereof is correspondingly diminished and reduces the overall brightness of the displayed image. However, the screen may be frosted for diffusing the image light thereat and producing a reasonable viewing image at an increased viewing angle.

U.S. Pat. No. 6,400,876 discloses another type of optical panel wherein horizontally disposed waveguides are stacked vertically in a column with substantially parallel inlet and outlet faces for further reducing the thickness of the panel. A transmissive right angle film is positioned at the inlet face for redirecting image light through the panel. The inlet face and outlet face may be frosted to diffuse the displayed image light.

In both types of optical panels, contrast of the image may be enhanced by introducing blackness in the cladding layers between the cores of the waveguides for absorbing ambient light incident at the display screen. The ends of the cladding layers are exposed at the screen and are directly viewable by a viewer as being black. And, in the '736 patent, a small light acceptance angle at the screen ensures that the ambient light received at the screen is absorbed by the black cladding.

However, scattering or diffusion of the outbound image light for enhancing viewing angle correspondingly decreases perceived contrast or blackness. A conventional diffuser on the display screen diffuses both outbound and incident ambient light, and back-scattering of the ambient light appears milky white at the diffuser which reduces the perceived blackness of the screen.

Accordingly, it is desired to provide an optical display panel having improved diffusion capabilities while maintaining or increasing the panel's perceived blackness or contrast.

These and other advantages of the present invention will become more fully apparent from the detailed description of the invention hereinbelow.

SUMMARY OF THE INVENTION

The present invention is directed to an optical panel for displaying an image, comprising a plurality of stacked optical waveguides, each having a first end and a second end, wherein an inlet face is defined by the plurality of first ends, and wherein an outlet face is defined by the plurality of second ends. The optical panel also comprises an inlet diffuser provided at said inlet face of said waveguides, wherein the inlet diffuser diffuses light that forms the image asymmetrically. When provided alone, the inlet diffuser may be configured for diffusing the light both in a first direction and in a second direction into the waveguides, and wherein the second direction is perpendicular to the first direction. The inlet diffuser may provide diffusion of the light in the first direction in an amount greater than diffusion of the light in the second direction.

Alternatively, the inlet diffuser may be accompanied by an outlet diffuser provided at the outlet face, wherein the outlet diffuser complements the inlet diffuser by differently diffusing the light spatially at the outlet face. The inlet diffuser may be configured for diffusing the light mostly in a first direction into the waveguides, wherein the outlet diffuser may be configured for diffusing the light mostly in a second direction, and wherein the second direction is perpendicular to the first direction. The inlet diffuser may provide diffusion of the light in the first direction in an amount greater than diffusion of the light in the second direction provided by the outlet diffuser.

BRIEF DESCRIPTION OF THE DRAWINGS

For the present invention to be clearly understood and readily practiced, the present invention will be described in conjunction with the following figures, wherein.

DESCRIPTION OF THE PREFERRED EMBODIMENTS

Figure 1:
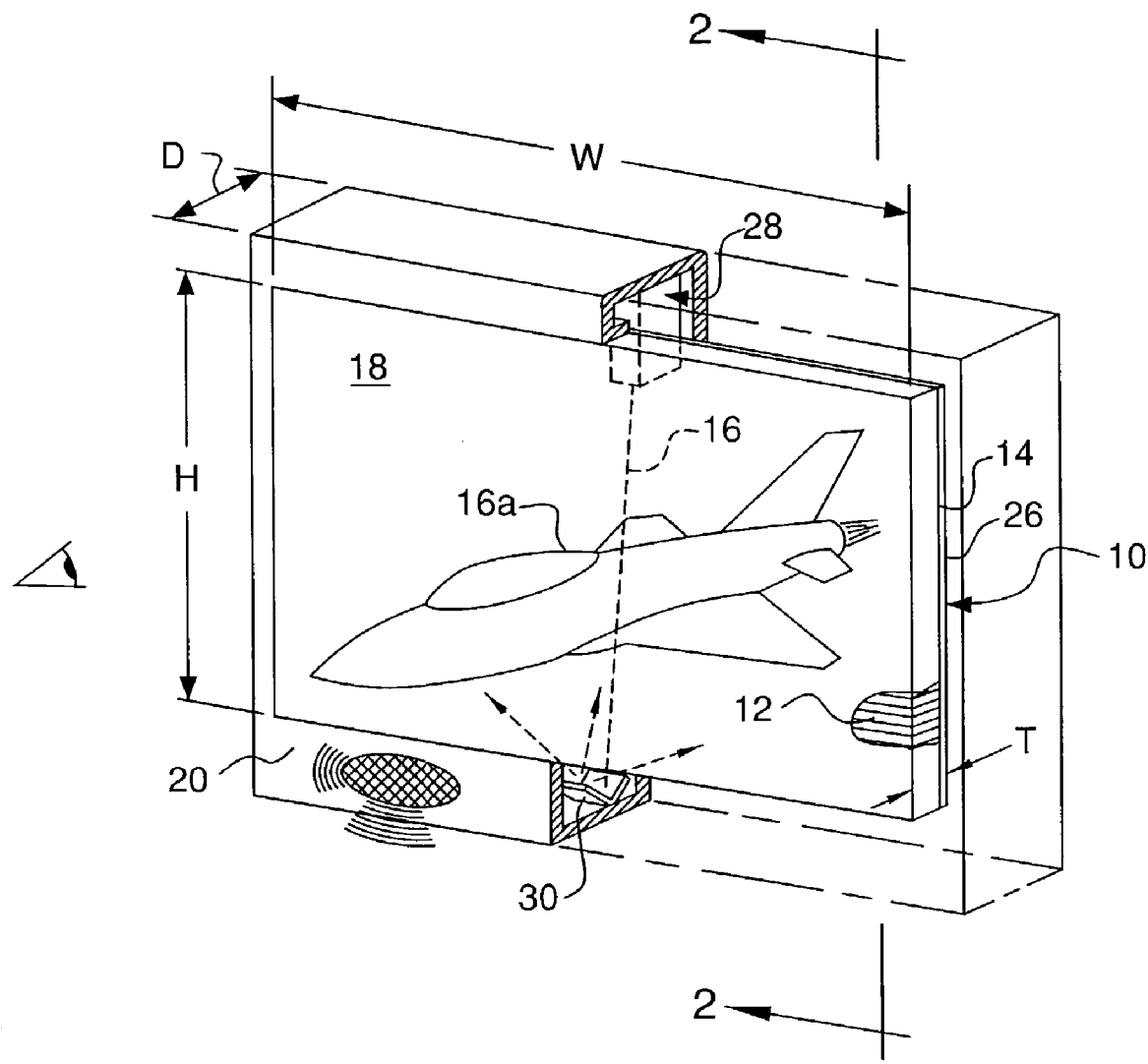
FIG. 1 is a partly sectional isometric view of an optical display panel in accordance with an exemplary embodiment of the present invention.

It is to be understood that the figures and descriptions of the present invention may have been simplified to illustrate elements that are relevant for a clear understanding of the present invention, while eliminating, for purposes of clarity, other elements found in a typical fastener. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Illustrated in FIG. 1 is an optical display panel 10 in accordance with one embodiment of the present invention in the form of a video display. The panel includes a plurality of vertically stacked planar optical waveguides 12 collectively defining an inlet face 14 at back ends thereof for receiving image light 16. The waveguides also define an outlet or display screen 18 at opposite front ends thereof disposed substantially parallel with the inlet face 14 for displaying the image light 16 as a video image 16a, for example.

Figure 2:
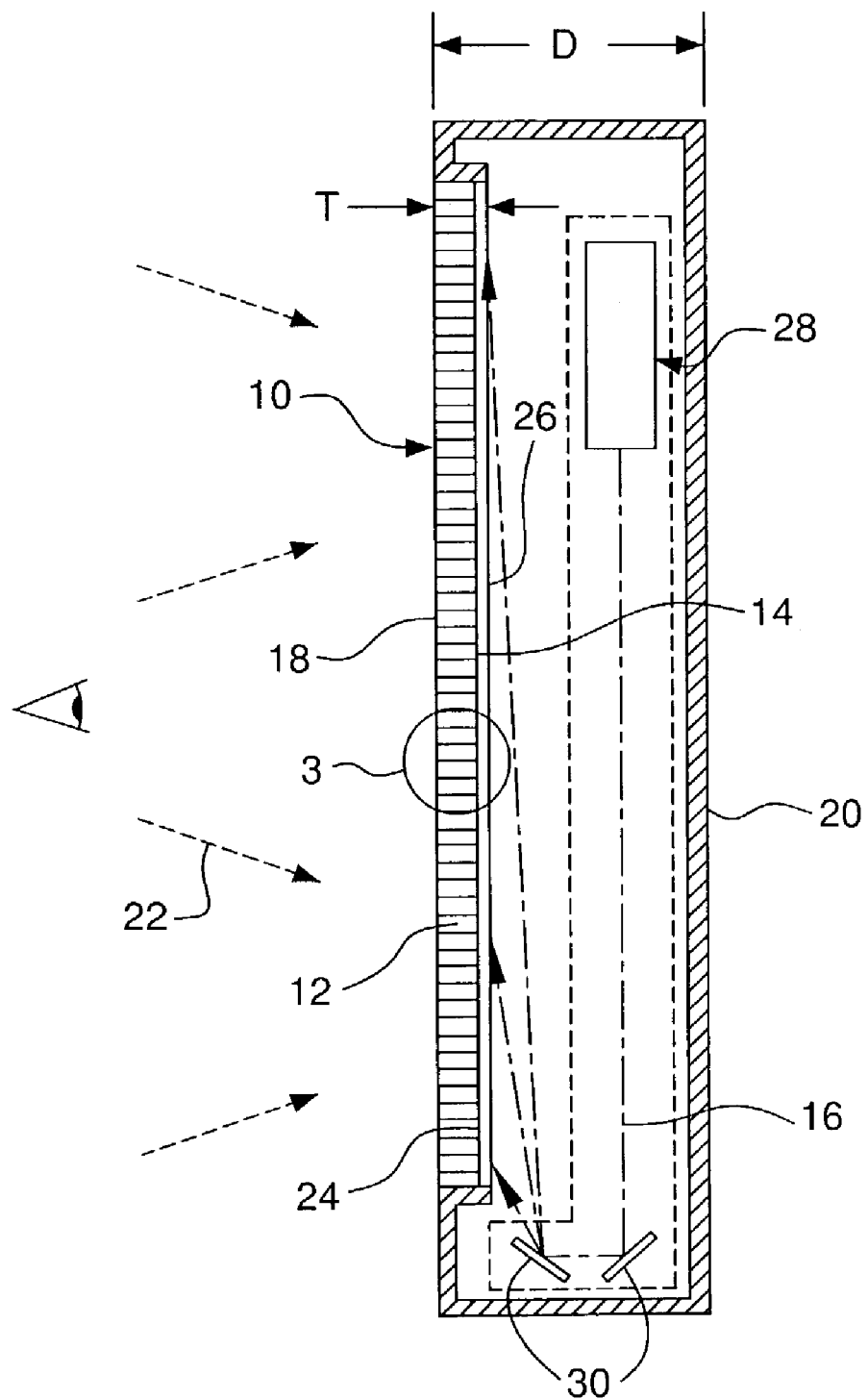
FIG. 2 is a sectional side view of the panel illustrated in FIG. 1 and taken along line 2—2 in FIG. 1.
Figure 3:
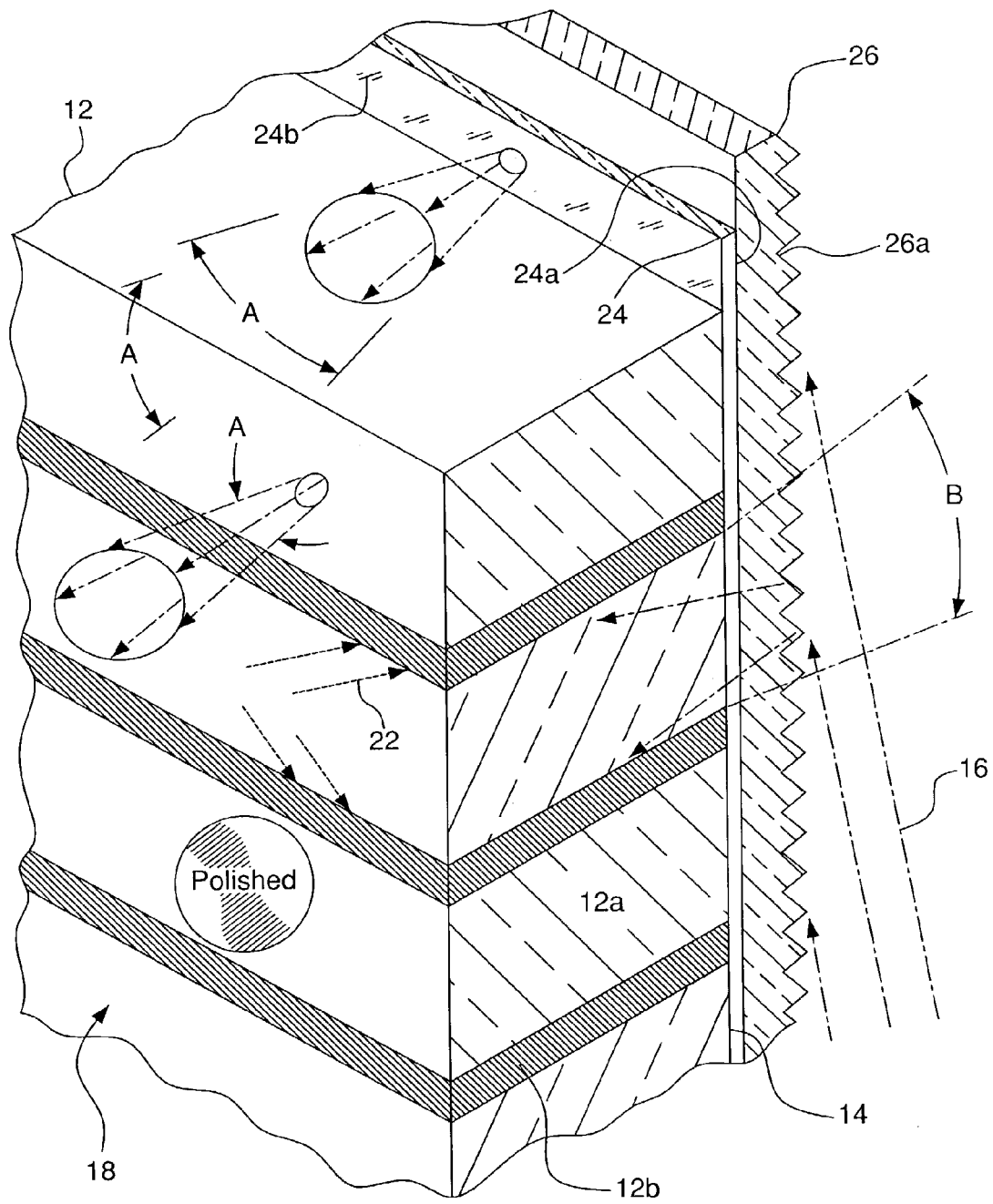
FIG. 3 is an enlarged isometric sectional view of a portion of the panel illustrated in FIG. 2 within the circle labeled 3 in FIG. 2.

FIG. 2 illustrates in section view the display panel 10 suitably mounted in its housing or cabinet 20, and FIG. 3 illustrates an enlarged portion of the panel 10 including the waveguides 12 thereof. Each waveguide 12 includes a central transparent core 12a having a first index of refraction, and may be formed, for example, of an optical plastic or glass. The cores 12a are laminated between layers of cladding 12b having a second index of refraction lower than the first index of refraction for providing substantially total internal reflection of the image light 16 as it is transmitted through the cores. The cladding 12b may be a suitable plastic or epoxy for example.

A significant feature of the optical panel is the vertical stacking of the waveguides resulting in substantially parallel surfaces of the inlet face 14 and screen 18 which allows the panel and enclosing cabinet 20 to be made ultrathin in depth. As shown in FIG. 1, the panel has a nominal thickness T which is the depth of the waveguides 12 between the inlet face 14 and the screen 18 and is substantially thinner in depth than a height H and width W of the viewable portion of the panel. For example, the panel may be configured in typical width to height ratios W/H of 4:3 or 16:9 for displaying a TV image. The height H may be about 100 cm and the width W may be about 133 cm, for example. And, the panel thickness T may be as little as about 1 cm, for example.

In a preferred embodiment, as shown in FIG. 3, the waveguides 12 are in the form of flat ribbons extending continuously in the horizontal direction along the entire panel width W. The ribbon waveguides are preferably stacked vertically on top of each other along the full panel height H, and may number about 525 waveguides for providing 525 vertical lines of resolution, or more or less as desired. The opposite back and front ends of the waveguides collectively define the panel inlet face 14 and display screen 18, respectively, which are substantially equal in size and area.

The image light may therefore be projected over the entire panel inlet face 14 for transmission through the individual waveguide cores and displayed as a video image on the display screen 18. Since the waveguide cores are transparent or clear, the video image is emitted from the display screen with a correspondingly small viewing angle both laterally or horizontally along the length of the waveguides, and transversely or vertically from waveguide-to-waveguide.

Accordingly, it is desirable to introduce a light diffusing or scattering element in the optical panel for spreading the image light to increase the field of view or viewing angle from the display screen. In conventional stacked optical waveguides, a suitable diffuser is introduced over the display screen, by providing frosting thereof for example, for scattering the image light both horizontally and vertically to permit off-perpendicular viewing of the image with adequate intensity and contrast.

However, the screen-side diffuser not only scatters the outbound image light for increasing field of view, but also scatters any ambient light incident on the screen side of the panel, which creates a milky white appearance over the display screen. Such milky white appearance correspondingly decreases the perceived contrast or blackness of the screen.

Contrast is an important feature of video display panels which significantly affects the quality of the image being viewed. The blacker the screen, the better the viewing quality of the image.

In order to introduce blackness at the screen 18, the cladding 12b as illustrated in FIG. 3 is comprised of a dark material and preferably is substantially black for absorbing ambient light 22 at the screen 18. The exposed edges of the cladding 12b at the screen 18 are directly viewable as being black to the observer. And, any ambient light which enters the waveguides off-axis through the screen 18 will be absorbed internally by the black cladding. The black cladding may be formed in any suitable manner such as, for example, with black spray paint, or carbon particles within an epoxy adhesive joining together the adjacent cores 12a with one or more cladding layers as desired between each core.

In order to introduce diffusion in the panel for enhancing the viewing angle, an inlet-side diffuser 24, or simply inlet diffuser, is disposed over the inlet face 14 of the waveguides as best illustrated in FIG. 3. The inlet diffuser scatters the image light 16 into the waveguides for display on the screen 18, with an increased field of view or viewing angle. The inlet diffuser may be formed integrally within the inlet face (e.g. by embossing), formed directly on the inlet face 14, or may be separately manufactured as a thin film and affixed to the inlet face.

The inlet diffuser 24 has an inlet surface 24a on one side for receiving the image light 16, and an outlet surface 24b on an opposite side thereof. The inlet surface may be smooth or polished, and the outlet surface may be configured, by frosting for example, for scattering the image light. Alternatively, the inlet surface, both inlet and outlet surfaces, an area between the inlet and outlet surfaces of the diffuser, or a combination thereof, may effect the diffusion.

The outlet surface 24b of the diffuser adjoins the inlet face 14 of the waveguides and is effective for diffusing the image light into the waveguide cores, which diffused image light is transmitted therethrough for projection outbound from the display screen 18. In this embodiment, the display screen 18 is smooth or polished, without diffusion effect itself, and permits unobstructed reception of the ambient light 22 into the waveguide cores wherein the ambient light is absorbed by the black cladding.

Since the diffuser is located solely on the inlet-side of the waveguides it does not cause the milky white appearance attributable to the screen-side diffuser, and it further enhances screen contrast by permitting ambient light to enter the screen without significant reflection or scattering and be absorbed by the black cladding.

The improved optical panel 10 therefore permits light in a video image to be initially projected against the diffuser inlet surface 24a, and then the image light 16 is channeled through the waveguides with total internal reflection. At the display screen, the image light is displayed with diffusion effected by the inlet-side diffuser.

Since the diffuser is located on the inlet side of the waveguides, the preferred method correspondingly includes receiving the ambient light at the unobstructed display screen; with the ambient light then being absorbed inside the waveguides at the black cladding. Since the display screen is preferably polished, ambient light is readily transmitted into the waveguide cores for absorption by the black cladding.

In the exemplary embodiment illustrated in FIG. 3, the inlet diffuser 24 has a uniform-scattering outlet surface 24b for axisymmetric diffusion of the image light both laterally and transversely into the waveguides with a common cone angle A. In this way, the field of view both horizontally and vertically are substantially the same.

Figure 4:
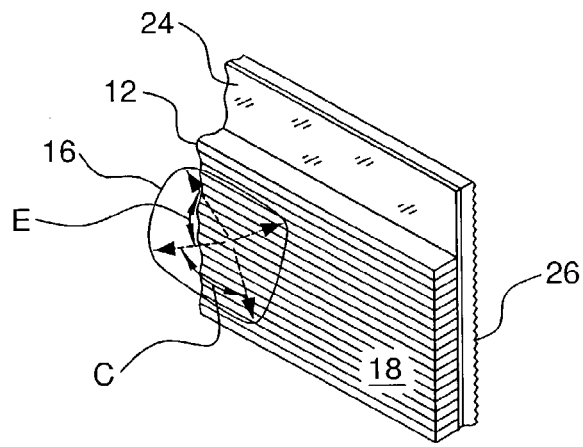
FIG. 4 is an isometric view of a portion of an optical display panel in accordance with an alternate embodiment of the present invention.

In the preferred embodiment illustrated in FIG. 4, the inlet diffuser 24 is configured for scattering or diffusing the image light asymmetrically, with lateral diffusion in the horizontal direction being significantly greater than the transverse diffusion in the vertical direction. Manufacturing an asymmetric diffuser of this type may be performed using various techniques. For example, an axisymmetrical diffuser (e.g. of polymer based material) is heated and stretched in a linear fashion. Once the material cools, it will enjoy more diffusion in one direction than the other. Another way to make an asymmetric diffuser is by employing holographic photolithography. An asymmetrical pattern would be optically projected onto a substrate on a master plate. To effect the pattern, for example, a series of concentric rings may be projected at a shallow angle so that a series of concentric ellipses would be imprinted on the substrate. The substrate would be processed and the plate may then be used as a master to press other diffusers. If diffusion in only one direction is desired, a series of parallel lines can instead be projected on the substrate. In this instance, the image light would be diffused in a direction perpendicular to the lines. As another example, lenticular lenses having gain in only one direction may alternatively be employed to achieve diffusion in only one direction.

Also shown in FIG. 3 is the light acceptance angle B for each of the waveguides 12. The acceptance angle is a conventional term of art and indicates the angle in which incident light will be transmitted inside the waveguide cores with total internal reflection; with incident light greater than the acceptance angle being rejected. The acceptance angle is determined in a conventional manner collectively by the first and second indices of refraction for the core and cladding.

Since the inlet diffuser is located on the inlet-side of the waveguides, the cone angle A thereof is preferably up to about the acceptance angle of the waveguides. If the cone angle A were larger than the acceptance angle, the additional diffusion thereof would be lost in non-transmission through the waveguides.

However, with contrast at the display screen in mind, small acceptance angles are preferred, for example about 10 degrees, for enhancing contrast at the display screen, with the ambient light being accepted at the display screen and absorbed inside the waveguides by the black cladding.

As shown most clearly in FIG. 3, a light redirector or coupler 26 adjoins the entire inlet surface 24a of the diffuser and may be suitably affixed thereto for coupling or redirecting the image light 16 through the inlet diffuser into the waveguides 12. The waveguides have a limited acceptance angle B for receiving incident light, and the coupler 26 ensures that the image light 16 is suitably turned in a direction for entering the waveguide cores 12a within their acceptance angles.

As shown in FIGS. 1 and 2, the cabinet 20 is suitably larger in height and width as desired for surrounding the panel 10, and has a depth D measured in most part in the rear direction from the front of the screen 18. In order to maintain the depth D of the cabinet as small as possible, the coupler 26 illustrated in FIGS. 2 and 3 is specifically configured for acutely turning the image light 16 through the diffuser into the inlet ends of the waveguides 12.

More specifically, the coupler 26 is preferably effective for turning the image light 16 in an exemplary range of about 45° up to about 90° to minimize the depth of the cabinet required for projecting the image light 16 into the panel. In a conventional rear projection TV screen, a projector is mounted behind the screen and requires a cabinet with substantial depth for incorporating the required optical train and path for projecting the image onto the panel.

As shown in FIG. 2, a projector 28 is optically aligned with the coupler 26 for projecting the image light 16 thereacross for transmission through the inlet diffuser and waveguides for display on the screen 18. In this embodiment, the projector 28 is disposed adjacent the top of the coupler for projecting the image light generally parallel thereto. The coupler turns the image light generally perpendicularly into the waveguide cores for transmission therethrough.

The projector 28 is illustrated schematically in FIG. 2 and includes a suitable light source for producing the image light. The light source may be, for example, a light bulb, slide projector, video projector, or laser, for example.

The projector also includes a modulator for modulating the image light 16 to form the light image. The modulator may be, for example, a conventional Liquid Crystal Display (LCD) having a matrix of elements which selectively block or reflect, or transmit light for producing a video image. Other types of modulators may instead be employed (see, for example, U.S. Pat. No. 6,400,876).

The projector also includes suitable image optics for distributing or broadcasting the image light horizontally and vertically across the coupler for transmission through the inlet diffuser and waveguides to display the image on the screen. The image optics may include focusing and expanding lenses and mirrors as required.

A plurality of folding mirrors 30 as shown in FIG. 2 are optically aligned between the projector and the coupler for allowing the projector to be positioned behind the coupler and parallel thereto at the top of the cabinet. The image light therefore is initially projected vertically downwardly inside the cabinet to the bottom thereof wherein the folding mirrors 30 are mounted which redirect the image light vertically upwardly at a small acute angle with respect to the plane of the coupler for broadcast over the entire exposed surface of the coupler.

The incidence angle of the image light on the coupler is determined by the capability of the coupler to turn or redirect the light into the inlet face of the waveguides. By maximizing the turning capability of the coupler, the projector may be mounted more closely adjacent to the coupler for reducing the required depth D of the cabinet. In one embodiment, the panel 10 has a thickness of about 1 cm, with the entire depth D of the cabinet being no greater than about 12 cm.

In the exemplary embodiment illustrated in FIG. 3, the coupler 26 comprises Fresnel prismatic grooves 26a which are straight along the width W of the panel and are spaced vertically apart along the height H of the panel. A preferred form of the prismatic coupler is a Transmissive Right Angle Film (TRAF) commercially available from the 3M Company of St. Paul, Minneapolis, under the tradename TRAF II. The coupler may take other forms as well, including, but not limited to, diffractive or holographic elements.

The particular advantage of the prismatic coupler 26 is to turn the image light 16 at up to a right angle into the inlet face of the waveguides. This allows the image light to be broadcast substantially parallel to the coupler and thusly substantially reduces the required depth D of the cabinet for mounting the projector and its associated optics. Since the panel 10 itself is thin and flat, the projector may be mounted within the cabinet in any suitable location for minimizing the volume and depth of the cabinet.

In the preferred embodiment illustrated in FIGS. 2 and 3, the waveguides 12 are perpendicular to the inlet face 14 and screen 18, with rectangular cross section, and the cores 12a extend solely horizontally without inclination. A significant advantage of this orientation is that the image light is transmitted horizontally through the waveguides for direct viewing by an observer or viewer. The viewer, therefore, receives the full intensity of the image light for maximum brightness. The individual waveguides ensure that the image light is transmitted therethrough without substantial loss, and with maximum resolution and brightness.

Contrast and blackness are significantly increased by placing the inlet diffuser 24 on the inlet face of the waveguides (i.e. rather than on the outlet face of the waveguides) thusly eliminating the otherwise milky white appearance of an outlet diffuser if exposed directly to ambient light. No obstruction is created on the display screen side of the panel, thereby permitting ambient light to enter the waveguide cores for absorption by the black cladding.

However, placing the diffuser on the inlet-side of the panel (i.e. inlet face of the waveguides) limits the vertical diffusion capability thereof due to the correspondingly small acceptance angle of the waveguide cores.

Figure 5:
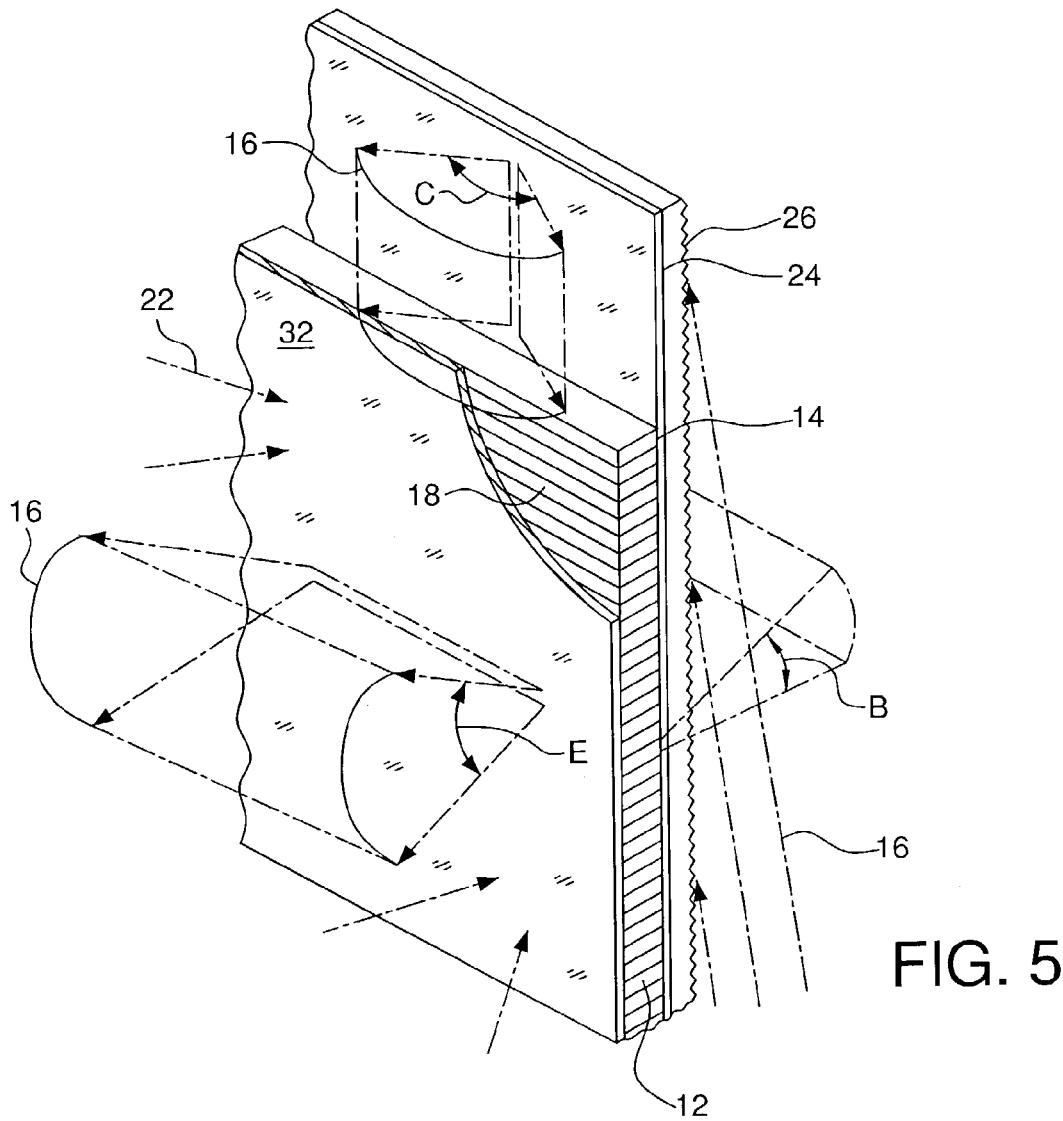
FIG. 5 is a partly sectional isometric view of a portion of an optical display panel in accordance with another alternate embodiment of the present invention.

Accordingly, FIG. 5 illustrates an alternate preferred embodiment of the invention further including an outlet diffuser 32 adjoining the display screen 18 and complementing the inlet diffuser 24, for differently diffusing light spatially at the screen. Like the inlet diffuser 24, the outlet diffuser 32 may have a smooth or polished inlet surface adjoining the display screen 18, and an outlet surface configured for scattering light, such as by frosting. Alternatively, the inlet surface, both inlet and outlet surfaces, an area between the inlet and outlet surfaces of the diffuser 32, or a combination thereof, may effect the diffusion.

For example, the inlet diffuser 24 is preferably configured to diffuse the image light laterally or horizontally along the individual waveguides, and the outlet diffuser 32 is preferably configured to diffuse the image light transversely or vertically from each waveguide. In this way, diffusion may be preferentially split between the opposite sides of the waveguides for additional advantage in field of view and contrast.

As shown in FIG. 5, the inlet diffuser 24 is preferentially configured to diffuse the image light laterally at a cone angle C which is greater than the cone angle E of diffusion effected transversely by the outlet diffuser 32. The horizontal field of view effected by the lateral diffusion cone angle C may be relatively high (as compared to the transverse diffusion cone angle E of the outlet diffuser), for example 120 degrees, for permitting off-angle viewing (i.e. in the horizontal direction) by the observer of a high quality display image.

The vertical field of view effected by the transverse diffusion cone angle E may be as high as, for example, 20 degrees, without diminution from the preferred small acceptance angle of the panel. In the preferred embodiment, the acceptance angle B of the waveguides may be about 10 degrees, which is significantly less than the preferred transverse diffusion cone angle E.

In this way, the vertical diffusion effected by the outlet diffuser 32 is not compromised by the small acceptance angle B as it would be if mounted on the inlet-side of the panel; yet, the small acceptance angle maximizes the absorption of ambient light by the black cladding bounding the waveguide cores. Since the vertical diffusion is substantially smaller than the horizontal diffusion desired for a video display panel of this type (i.e. with horizontally disposed waveguides), the milky white appearance over the display screen is minimized for maintaining high contrast of the viewing image from the optical panel.

Preferential asymmetric diffusion may therefore be effected in the embodiment illustrated in FIG. 5 using two diffusers 24,32 on opposite sides of the waveguides 12; or with a single, inlet-side diffuser 24 in the embodiment illustrated in FIG. 4. The horizontal cone angle C of diffusion in FIG. 4 may be the same as that in FIG. 5, 120 degrees for example; yet the vertical diffusion cone angle E illustrated in FIG. 4 is limited by the ability of the waveguides 12 to carry the vertically diffused image light up to the acceptance angle of the waveguides, 10 degrees for example.

The ability to provide diffusion on the inlet-side of the optical panel therefore permits tailoring of both field of view and contrast for maximizing both in a manner not possible from outlet-side diffusers alone. Diffusion may be preferentially split between the inlet-side and outlet-side of the panel to complement the optical transmission attributes of the waveguides, including limited acceptance angle and absorption of ambient light internally by the black cladding.

The bifurcated diffusion embodiment illustrated in FIG. 5 may be used in substantially the same manner as the inlet-side-only diffusion embodiment illustrated in FIGS. 1–4. The method of use is substantially identical, except that diffusion occurs in horizontal part in the inlet diffuser 24 on the inlet-side of the panel; and then complementary diffusion occurs in remaining, vertical part in the outlet diffuser 32 on the outlet-side of the panel. In another preferred embodiment, the inlet diffuser 24 may provide both horizontal and vertical diffusion in an asymmetrical fashion, with the outlet diffuser 32 providing supplemental diffusion in the vertical direction. In any of the above bifurcated diffusion scenarios, the asymmetric inlet diffuser 24 and/or the asymmetric outlet diffuser 32 may be composed and manufactured as per the inlet diffuser 24 of the FIG. 4 embodiment described above.

The limited angle of diffusion of the outlet diffuser 32 reduces its milky white appearance, and permits ambient light to travel therethrough into the waveguides for absorption by the black cladding. Contrast or perceived blackness are thusly enhanced without compromising field of view.

The bifurcated diffusion embodiment may also use the coupler 26 and projector 28 in the same manner disclosed above for the embodiment illustrated in FIGS. 1–4 to enjoy the benefits of the thin cabinet configuration containing the optical panel.

The various embodiments of the optical panels disclosed above enjoy multiple advantages from the stacked waveguides having inlet-side diffusers. The optical waveguides not only ensure the high efficient transmission of the image light therethrough to the screen with high intensity and contrast, but also are advantageous in confronting ambient light for improving screen blackness and contrast. The inlet-side diffuser increases field of view, while also increasing contrast to achieve an ultrablack optical display panel.

The bifurcated diffusers on both inlet-side and outlet-side of the waveguides further increase field of view without limit by acceptance angle, while also enhancing contrast. By providing the greater desired diffusion (i.e. in the horizontal direction) at the inlet face 14 of the waveguides (i.e. away from the display screen 18) and the lesser desired diffusion (i.e. in the vertical direction) at the display screen 18, the display screen (i.e. with the outlet diffuser thereon) will appear less milky white, thereby resulting in greater perceived blackness and significantly increased contrast. Moreover, the horizontally disposed waveguides allow substantially full transmission of the diffused light in the horizontal direction thereby maintaining diffusion efficiency in the horizontal direction while increasing contrast of the optical panel.

Those of ordinary skill in the art will recognize that various modifications and variations may be made to the embodiments described above without departing from the spirit and scope of the present invention. For example, although the embodiments above describe aspects of the invention in conjunction with an optical panel having an inlet face 14 of the waveguides being substantially parallel to a outlet face 18 of the waveguides, other optical panel configurations such as, for example, an optical panel having a wedge shaped design (i.e. the inlet and outlet faces of the waveguides provided in a non-parallel type fashion) as per U.S. Pat. No. 5,625,736 may also be contemplated. Also, in the FIG. 5 embodiment, although the inlet diffuser 24 has been described as providing only lateral diffusion while the outlet diffuser 32 provides only transverse diffusion, the inlet diffuser 24 may additionally provide a portion of the transverse diffusion. Similarly, the outlet diffuser 32 may additionally provide a portion of the lateral diffusion. It is therefore to be understood that the present invention is not limited to the particular embodiments disclosed above, but it is intended to cover such modifications and variations as defined by the following claims.

What is claimed is:

1. An optical panel for displaying an image, comprising:
   a plurality of stacked optical waveguides, each having a first end and a second end, wherein an inlet face is defined by the plurality of first ends, and wherein an outlet face is defined by the plurality of second ends; and
   an inlet diffuser provided at the inlet face of the waveguides, wherein the inlet diffuser diffuses light that forms the image asymmetrically, wherein the inlet diffuser is configured for diffusing the light both in a first direction and in a second direction into the waveguides, wherein the second direction is perpendicular to the first direction, and wherein the inlet diffuser provides diffusion of the light in the first direction in an amount greater than diffusion of the light in the second direction.

2. The optical panel according to claim 1, wherein the first direction is the horizontal direction, wherein the second direction is the vertical direction, and wherein each waveguide extends horizontally along a width of the panel.

3. The optical panel according to claim 1, wherein each of the waveguides includes a transmissive core having a first index of refraction, each transmissive core bound by cladding having a second index of refraction being less than the first index of refraction, and wherein the waveguides have an acceptance angle determined collectively by the first and second indices of refraction.

4. The optical panel according to claim 3, wherein the inlet diffuser has a diffusion cone angle in the second direction being less than or substantially equal to the acceptance angle of the waveguides.

5. The optical panel according to claim 3, wherein the cladding comprises a substantially black material.

6. The optical panel according to claim 1, wherein the inlet diffuser comprises diffusion elements in the form of concentric ellipses.

7. The optical panel according to claim 1, wherein the inlet diffuser comprises diffusion elements in the form of parallel lines which effect diffusion in substantially only one direction.

8. The optical panel according to claim 1, wherein the inlet diffuser comprises diffusion elements in the form of lenticular lenses having gain in substantially only one direction.

9. The optical panel according to claim 1 further comprising a coupler provided at an inlet surface of the inlet diffuser for redirecting the light through the inlet diffuser into the waveguides.

10. The optical panel according to claim 9, wherein the coupler comprises Fresnel prismatic grooves.

11. The optical panel according to claim 9, wherein the coupler comprises a transmissive right angle film.

12. The optical panel according to claim 1, wherein the waveguides are planar.

13. The optical panel according to claim 1, wherein the inlet face is substantially parallel to the outlet face.

14. An optical panel for displaying an image, comprising:
    a plurality of stacked optical waveguides, each having a first end and a second end, wherein an inlet face is defined by the plurality of first ends, and wherein an outlet face is defined by the plurality of second ends;
    an inlet diffuser provided at the inlet face of the waveguides, wherein the inlet diffuser diffuses light that forms the image asymmetrically; and
    an outlet diffuser provided at the outlet face, wherein the outlet diffuser complements the inlet diffuser by differently diffusing the light spatially at the outlet face;
    wherein the inlet diffuser is configured for diffusing the light mostly in a first direction into the waveguides, wherein the outlet diffuser is configured for diffusing the light mostly in a second direction, and wherein the second direction is perpendicular to the first direction.

15. The optical panel according to claim 14, wherein the inlet diffuser provides diffusion of the light in the first direction in an amount greater than diffusion of the light in the second direction provided by the outlet diffuser.

16. The optical panel according to claim 14, wherein the first direction is the horizontal direction, wherein the second direction is the vertical direction, and wherein each waveguide extends horizontally along a width of the panel.

17. The optical panel according to claim 14, wherein each of the waveguides includes a transmissive core having a first index of refraction, each transmissive core bound by cladding having a second index of refraction being less than the first index of refraction, and wherein the waveguides have an acceptance angle determined collectively by the first and second indices of refraction.

18. The optical panel according to claim 17, wherein the inlet diffuser has a diffusion cone angle in the second direction being less than or substantially equal to the acceptance angle of the waveguides.

19. The optical panel according to claim 17, wherein the cladding comprises a substantially black material.

20. The optical panel according to claim 14, wherein the inlet diffuser is configured to diffuse the light in the first direction at a cone angle greater than a cone angle of diffusion of the light in the second direction from the outlet diffuser.

21. The optical panel according to claim 14, wherein the inlet diffuser comprises diffusion elements in the form of parallel lines which effect diffusion in substantially only the first direction.

22. The optical panel according to claim 14, wherein the inlet diffuser comprises diffusion elements in the form of lenticular lenses having gain in substantially only the first direction.

23. The optical panel according to claim 14, wherein the outlet diffuser comprises diffusion elements in the form of parallel lines which effect diffusion in substantially only the second direction.

24. The optical panel according to claim 14, wherein the outlet diffuser comprises diffusion elements in the form of lenticular lenses having gain in substantially only the second direction.

25. The optical panel according to claim 14 further comprising a coupler provided at an inlet surface of the inlet diffuser for redirecting the light through the inlet diffuser into the waveguides.

26. The optical panel according to claim 25, wherein the coupler comprises Fresnel prismatic grooves.

27. The optical panel according to claim 25, wherein the coupler comprises a transmissive right angle film.

28. The optical panel according to claim 14, wherein the waveguides are planar.

29. An optical panel for displaying an image, comprising:
a plurality of stacked optical waveguides, each having a first end and a second end, wherein an inlet face is defined by the plurality of first ends, and wherein an outlet face is defined by the plurality of second ends;
an inlet diffuser provided at the inlet face of the waveguides, wherein the inlet diffuser diffuses light that forms the image asymmetrically; and
an outlet diffuser provided at the outlet face, wherein the outlet diffuser complements the inlet diffuser by differently diffusing the light spatially at the outlet face;
wherein the inlet diffuser is configured for diffusing the light both in a first direction and in a second direction into the waveguides, wherein the outlet diffuser is configured for diffusing the light mostly in the second direction, and wherein the second direction is perpendicular to the first direction.

30. The optical panel according to claim 29, wherein the inlet diffuser provides diffusion of the light in the first direction in an amount greater than diffusion of the light in the second direction.

31. The optical panel according to claim 29, wherein the first direction is the horizontal direction, wherein the second direction is the vertical direction, and wherein each waveguide extends horizontally along a width of the panel.

32. The optical panel according to claim 29, wherein each of the waveguides includes a transmissive core having a first index of refraction, each transmissive core bound by cladding having a second index of refraction being less than the first index of refraction, and wherein the waveguides have an acceptance angle determined collectively by the first and second indices of refraction.

33. The optical panel according to claim 32, wherein the inlet diffuser has a diffusion cone angle in the second direction being less than or substantially equal to the acceptance angle of the waveguides.

34. The optical panel according to claim 32, wherein the cladding comprises a substantially black material.

35. The optical panel according to claim 29, wherein the inlet diffuser is configured to diffuse the light in the first direction at a cone angle greater than a cone angle of diffusion of the light in the second direction.

36. The optical panel according to claim 29, wherein the inlet diffuser is configured to diffuse the light in the first direction at a cone angle greater than a cone angle of diffusion of the light in the second direction from the outlet diffuser.

37. The optical panel according to claim 29, wherein the inlet diffuser comprises diffusion elements in the form of concentric ellipses.

38. The optical panel according to claim 29 further comprising a coupler provided at an inlet surface of the inlet diffuser for redirecting the light through the inlet diffuser into the waveguides.

39. The optical panel according to claim 29, wherein the waveguides are planar.

* * * * *